United States Patent
Zhou et al.

(10) Patent No.: US 11,483,462 B2
(45) Date of Patent: Oct. 25, 2022

(54) ELECTRONIC DEVICE AND CAMERA DEVICE

(71) Applicants: K-Tronics (Suzhou) Technology Co., Ltd., Jiangsu (CN); BOE TECHNOLOGY GROUP CO., LTD., Beijing (CN)

(72) Inventors: Xiuhe Zhou, Beijing (CN); Jun Li, Beijing (CN)

(73) Assignees: K-TRONICS (SUZHOU) TECHNOLOGY CO., LTD., Jiangsu (CN); BOE TECHNOLOGY GROUP CO., LTD., Beijing (CN)

( * ) Notice: Subject to any disclaimer, the term of this patent is extended or adjusted under 35 U.S.C. 154(b) by 174 days.

(21) Appl. No.: 16/935,353

(22) Filed: Jul. 22, 2020

(65) Prior Publication Data
US 2021/0075943 A1    Mar. 11, 2021

(30) Foreign Application Priority Data
Sep. 9, 2019    (CN) .......................... 201910848433.5

(51) Int. Cl.
*H04N 5/225*    (2006.01)
*H04R 1/08*    (2006.01)
(Continued)

(52) U.S. Cl.
CPC ........... *H04N 5/2257* (2013.01); *G06F 3/167* (2013.01); *H04N 5/2253* (2013.01);
(Continued)

(58) Field of Classification Search
CPC ............... H04N 5/2257; H04N 5/2253; H04N 5/2251; H04N 5/23299; H04N 21/4122;
(Continued)

(56) References Cited

U.S. PATENT DOCUMENTS

| 5,612,733 A | * | 3/1997 | Flohr | H04N 7/142 348/E7.079 |
| 2011/0127392 A1 | * | 6/2011 | Carter | F16M 13/00 248/419 |

(Continued)

FOREIGN PATENT DOCUMENTS

| CN | 201945784 U | 8/2011 |
| CN | 103314248 A | 9/2013 |

(Continued)

OTHER PUBLICATIONS

Marshall Electronics CVM-5 Camera Mount, https://www.thomannmusic.com/marshall_electronics_cvm_5_camera_clip_mount.htm (Year: 2022).*
Marshall Electronics—1/4" Compact Camera Stands & Mount Solutions, Jan. 7, 2019 (Year: 2019).*
First Office Action, including Search Report, for Chinese Patent Application No. 201910848433.5, dated Aug. 31, 2021, 16 pages.

*Primary Examiner* — Nelson D. Hernández Hernández
(74) *Attorney, Agent, or Firm* — Westman, Champlin & Koehler, P.A.

(57) ABSTRACT

An electronic device and a camera device are provided. The electronic device includes a device casing, the device casing including a side frame and a rear shell; a camera mechanism on the side frame or the rear shell; a connecting member fixedly connected to the side frame or the rear shell; and a support plate, the camera mechanism being connected to the support plate through a first pivotal shaft, the support plate being connected to the connecting member through a second pivotal shaft, wherein the support plate is rotatable relative to the connecting member through the second pivotal shaft, so as to drive the camera mechanism to rotate above a top surface of the side frame of the device casing, and the camera mechanism is rotatable relative to the support plate (Continued)

through the first pivotal shaft, so as to adjust an orientation of the camera mechanism.

14 Claims, 8 Drawing Sheets

(51) Int. Cl.
*G06F 3/16* (2006.01)
*H04N 5/232* (2006.01)

(52) U.S. Cl.
CPC ........... *H04N 5/23299* (2018.08); *H04R 1/08* (2013.01); *H04R 2499/11* (2013.01)

(58) Field of Classification Search
CPC .............. G06F 3/167; H04R 2201/025; H04R 1/028; H04R 2499/15
See application file for complete search history.

(56) References Cited

U.S. PATENT DOCUMENTS

| | | | |
|---|---|---|---|
| 2013/0284879 A1 | 10/2013 | Low et al. | |
| 2015/0268477 A1* | 9/2015 | Ge | G02B 30/31 |
| | | | 349/15 |
| 2016/0205293 A1* | 7/2016 | Jung | H04N 5/2252 |
| | | | 348/373 |

FOREIGN PATENT DOCUMENTS

| | | |
|---|---|---|
| CN | 204062407 U | 12/2014 |
| CN | 204168401 U | 2/2015 |
| CN | 104423438 A | 3/2015 |
| CN | 208623766 U | 3/2019 |
| CN | 208707749 U | 4/2019 |
| TW | 581362 U | 3/2004 |

* cited by examiner

ELECTRONIC DEVICE AND CAMERA DEVICE

CROSS-REFERENCE TO RELATED APPLICATION

This application claims the benefit of Chinese Patent Application No. 201910848433.5 filed on Sep. 9, 2019 in the National Intellectual Property Administration of China, the whole disclosure of which is incorporated herein by reference.

TECHNICAL FIELD

The present disclosure relates to the field of electronic technology, in particular to an electronic device and a camera device.

BACKGROUND

At present, some electronic devices may usually be installed with some accessory devices, such as camera mechanisms. These accessory devices are provided so that the electronic devices have more abundant functions. The camera mechanism is generally disposed in a side frame surrounding a display panel of the electronic device, so that it is difficult for the electronic device to achieve a narrower frame.

SUMMARY

Disclosed embodiments are directed to an electronic device and a camera device.

In some embodiments, an electronic device is provided, including: a device casing, the device casing including a side frame and a rear shell; a connecting member fixedly connected to the side frame or the rear shell; a first pivotal shaft; a second pivotal shaft; a camera mechanism connected to the side frame or the rear shell; and a support plate, the camera mechanism being connected to the support plate through a first pivotal shaft, the support plate being connected to the connecting member through a second pivotal shaft, wherein the support plate is rotatable relative to the connecting member through the second pivotal shaft, so as to drive the camera mechanism to rotate above a top surface of the side frame of the device casing, and the camera mechanism is rotatable relative to the support plate through the first pivotal shaft, so as to adjust an orientation of the camera mechanism.

According to some exemplary embodiments, the rear shell includes a main surface and four side surfaces, one of the four side surfaces of the rear shell is a top surface of the rear shell, and the connecting member is fixedly connected to the top surface of the rear shell; the side frame includes a main surface and four side surfaces, one of the four side surfaces of the side frame is a top surface of the side frame; and the top surface of the rear shell is lower than the top surface of the side frame.

According to some exemplary embodiments, the support plate includes a top surface, a bottom surface and at least two opposite side ends, the at least two opposite side ends are located between the top surface and the bottom surface of the support plate, and the support plate is respectively connected to the first pivotal shaft and the second pivotal shaft through the at least two opposite side ends of the support plate.

According to some exemplary embodiments, the device casing further includes a side wall, the side wall being located between the top surface of the rear shell and the top surface of the side frame; and the second pivotal shaft is disposed on a side of the connecting member close to the side wall.

According to some exemplary embodiments, a projection of a combination of the camera mechanism, the support plate, and the connecting member on the top surface of the rear shell falls within the top surface of the rear shell.

According to some exemplary embodiments, the at least two opposite side ends of the support plate include a first side end and a second side end, and a width between the first side end and the second side of the support plate is not less than a height difference between the top surface of the side frame and the top surface of the rear shell.

According to some exemplary embodiments, the support plate includes at least one opening penetrating the support plate.

According to some exemplary embodiments, the support plate has a trapezoidal plate-like structure.

According to some exemplary embodiments, a bolt penetrates the connecting member and is inserted into the top surface of the rear shell so that the connecting member is fixedly connected to the top surface of the rear shell; and/or, an adhesive is provided between the connecting member and the top surface of the rear shell so that the connecting member is fixedly connected to the top surface of the rear shell; and/or, both the connecting member and the rear shell are made of iron, the connecting member is attracted onto the top surface of the rear shell by a magnet so that the connecting member is fixedly connected to the top surface of the rear shell.

The connecting member is fixedly connected to the top surface of the rear shell through at least one of a bolt, an adhesive, or a magnet.

According to some exemplary embodiments, the electronic device further includes a housing, the camera mechanism is disposed in the housing, the housing includes at least a first end portion, and the first end portion is connected to the support plate through the first pivotal shaft.

According to some exemplary embodiments, the camera mechanism includes a camera, and the electronic device further includes at least one of a microphone, a voice recognition device, a communication device, or a circuit board provided in the housing, the circuit board is electrically connected to at least one of the camera, the microphone, the voice recognition device or the communication device, and the housing is provided with a first through hole in a positional correspondence with at least one of the microphone and the voice recognition device.

According to some exemplary embodiments, the circuit board is installed close to an inner wall of the housing away from the first pivotal shaft, and at least two of the camera, the microphone, the voice recognition device, or the communication device are arranged on the circuit board side by side in a length direction of the housing.

According to some exemplary embodiments, the electronic device further includes a flexible connecting wire in the housing, the housing is provided with a second through hole for allowing the flexible connecting wire to pass through, at least one of the camera, the microphone, the voice recognition device, the communication device, or the circuit board is electrically connected to a main board of the electronic device through the flexible connecting wire.

According to some exemplary embodiments, the housing includes an upper housing and a lower housing, the first pivotal shaft is connected to the lower housing, the upper housing and the lower housing are detachably connected, at least one of the camera, the microphone, the voice recognition device, the communication device, or the circuit board is disposed in the lower housing, and the second through hole is opened at a corner of a bottom surface of the lower housing.

In some embodiments, a camera device is provided, including: a camera mechanism; a support plate, the support plate including a top surface, a bottom surface and at least two opposite side ends, the at least two opposite side ends being located between the top surface and the bottom surface of the support plate; a first pivotal shaft and a second pivotal shaft, the first pivotal shaft and the second pivotal shaft being located at the two opposite side ends of the support plate, respectively; and a connecting member, wherein the camera mechanism is connected to the support plate through the first pivotal shaft, the support plate is connected to the connecting member through the second pivotal shaft, and the camera mechanism and the support plate may be folded or unfolded through the first pivotal shaft and the second pivotal shaft.

According to some exemplary embodiments, the camera device further includes a housing, the camera mechanism is disposed in the housing, the housing includes at least a first end portion, and the first end portion of the housing is connected to the support plate through the first pivotal shaft.

According to some exemplary embodiments, the camera mechanism includes a camera, and the camera device further includes at least one of a microphone, a voice recognition device, a communication device, or a circuit board provided in the housing, the circuit board is electrically connected to at least one of the camera, the microphone, the voice recognition device or the communication device, and the housing is provided with a first through hole in a positional correspondence with at least one of the microphone and the voice recognition device.

According to some exemplary embodiments, the circuit board is installed close to an inner wall of the housing away from the first pivotal shaft, and at least two of the camera, the microphone, the voice recognition device, or the communication device are arranged on the circuit board side by side in a length direction of the housing.

According to some exemplary embodiments, the camera device further includes a flexible connecting wire in the housing, the housing is provided with a second through hole for allowing the flexible connecting wire to pass through, at least one of the camera, the microphone, the voice recognition device, the communication device, or the circuit board is electrically connected to an external circuit board through the flexible connecting wire.

According to some exemplary embodiments, the housing includes an upper housing and a lower housing, the first pivotal shaft is connected to the lower housing, the upper housing and the lower housing are detachably connected, at least one of the camera, the microphone, the voice recognition device, the communication device, or the circuit board is disposed in the lower housing, and the second through hole is opened at a corner of a bottom surface of the lower housing.

BRIEF DESCRIPTION OF THE DRAWINGS

In order to more clearly explain the embodiments of the present disclosure, drawings which are required to describe the embodiments will be briefly introduced below. Obviously, the drawings introduced below are only some embodiments of the present disclosure. For those skilled in the art, other drawings may also be obtained based on these drawings without paying any creative work.

DETAILED DESCRIPTION OF EMBODIMENTS

In order to make the purpose, technical solutions and advantages of the disclosure more clear, the disclosure will be further described in detail in conjunction with specific embodiments and with reference to the accompanying drawings.

It should be noted that expressions such as "first" and "second" used in the embodiments of the present disclosure are used to distinguish two entities or parameters which have the same name but are not the same one. It may be seen that "first" and "second" are merely for convenience of expression, and should not be understood as limiting the embodiments of the present disclosure.

In this context, for ease of description, spatial relationship terms such as "top", "bottom", "front", "rear", etc. may be used to describe a relative positional relationship between one element or feature and another element or feature. It should be noted that this context relates to electronic devices such as displays, electronic whiteboards, or televisions. These devices usually display information for users to watch. These spatial relationship terms are usually described for a normal use state of the electronic devices. For example, "front" may indicate a direction at a side of the electronic device facing the user, "back" may indicate a direction at a side of the electronic device facing away from the user, "top" may indicate an upper side of the electronic device in the normal use state, and "bottom" may indicate a lower side of the electronic device in the normal use state. It should be understood that the spatial relationship terms are intended to cover different orientations of the device in use or operation in addition to the orientations described in the figures. For example, if the devices in the figures are turned over, elements described as "below" or "beneath" other elements or features would then be oriented "above" or "above" other elements or features.

Figure 1:
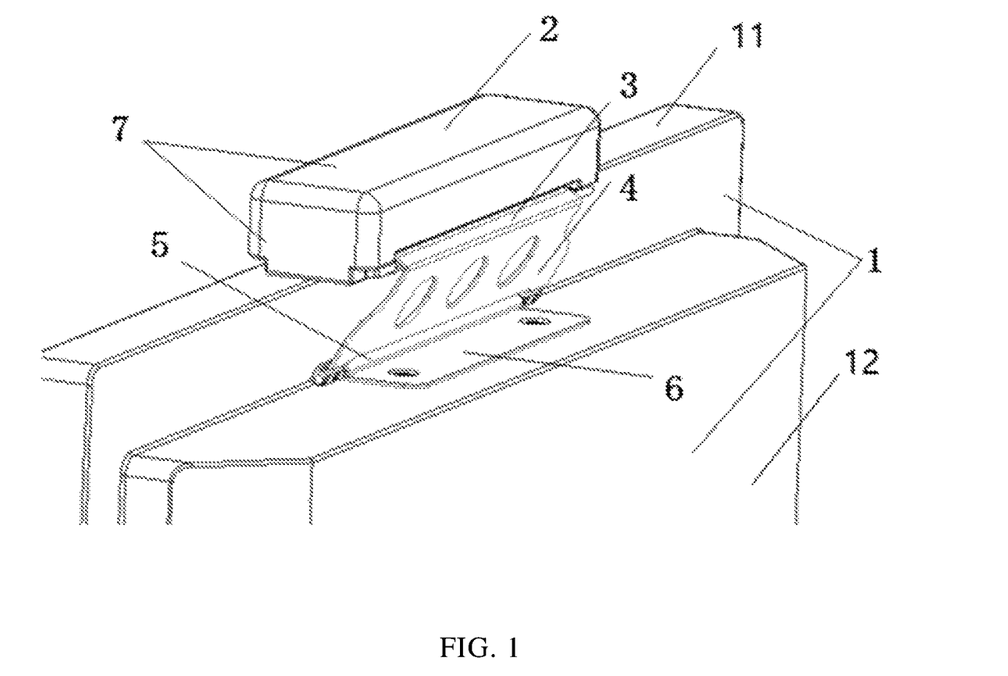
FIG. 1 is a schematic partial view of an electronic device according to some exemplary embodiments.

FIG. 1 is a partial schematic view of an electronic device according to some exemplary embodiments. For example, the electronic device may include a device body and a device casing. The device body may include a display panel, and the device casing may support, enclose and/or seal the device body. As shown in FIG. 1, the electronic device includes a device casing 1, and the device casing 1 includes a side frame 11 and a rear shell 12. The electronic device further includes: a camera mechanism 2, a first pivotal shaft 3, a support plate 4, a second pivotal shaft 5, and a connecting member 6. The camera mechanism 2 is provided on the side frame 11 or the rear shell 12. FIG. 1 shows a case where the camera mechanism 2 is provided on the rear shell 12. The camera mechanism 2 is connected to the support plate 4 through the first pivotal shaft 3, the support plate 4 is connected to the connecting member 6 through the second pivotal shaft 5, and the connecting member 6 is connected to the side frame 11 or the rear shell 12 of the device casing 1. The support plate 4 rotates relative to the connecting member 6 through the second pivotal shaft 5 to drive the camera mechanism 2 to rotate to the top of the side frame 11 of the device casing 1. The camera mechanism 2 may rotate relative to the support plate 4 through the first pivotal shaft 3 to adjust the orientation of the camera.

In some exemplary embodiments, the device casing may include a plate-like structure and a rear shell connected to the plate-like structure. Wherein, the plate-like structure may have any shape, and the plate-like structure may include a main surface 116 and at least one side surface, for example, four side surfaces. For example, the main surface 116 may be substantially parallel to the surface of the electronic device facing to the user. The at least one side surface is located on the side of the main surface 116. The side frame 11 is located on the at least one side surface, and the camera mechanism may be provided on the side frame 11. For example, when the plate-like structure is rectangular, the camera mechanism may be disposed on the top surface of the side frame of any one of the four side surfaces of the plate-like structure. When the plate-like structure is circular, the camera mechanism may be provided at any position on the top surface of the side frame of the plate-like structure.

Figure 2:
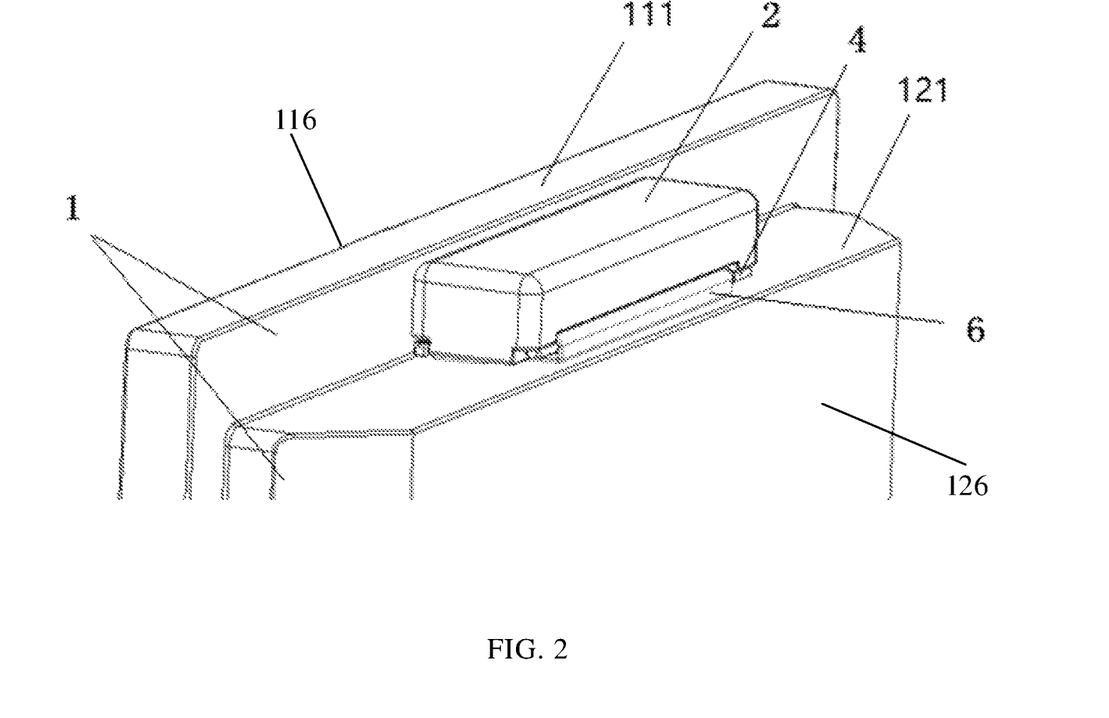
FIG. 2 is a schematic view showing that a camera mechanism according to some exemplary embodiments is hidden in a recess at an end of an electronic device in a folded state.

In other exemplary embodiments, the device casing may include a front shell and a rear shell 12, and the rear shell 12 may have a rectangular main surface 126 and four side surfaces. For example, the main surface 126 may be substantially parallel to the surface of the electronic device facing the user. The four side surfaces may be located on four sides of the main surface 126, respectively. As shown in FIG. 2, the surface 121 is one of the four side surfaces. For example, the four side surfaces may be all rectangular or all trapezoidal. The camera mechanism may be provided on at least one side surface of the rear shell 12. Alternatively, the rear shell 12 may have a main surface of any shape and a side frame located on the side of the main surface. In this case, the camera mechanism may be provided on the side frame of the rear shell 12. In addition, the rear shell may further include an arc-shaped surface. In this case, the camera mechanism may be disposed on the side frame located on the side of the arc-shaped surface.

The electronic device in the embodiments of the present disclosure may be, for example, a display, an electronic whiteboard, a television, or the like.

In the electronic device according to the embodiments of the present disclosure, the camera mechanism is disposed on the side frame or the rear shell thereof, the camera mechanism is connected to the support plate through the first pivotal shaft, the support plate is connected to the connecting member through the second pivotal shaft, and the connecting member is connected to the side frame or the rear shell of the device casing, so that the support plate may rotate relative to the connecting member through the second pivotal shaft to drive the camera mechanism to rotate to the top of the side frame of the device casing or the top of the rear shell of the device casing. The camera mechanism may rotate relative to the support plate through the first pivotal shaft to adjust the orientation of the camera, so that the camera mechanism may be folded or unfolded on the side frame or the rear shell of the electronic device, saving the space of the electronic device occupied by the camera mechanism, thereby enabling the electronic device to achieve a narrow frame.

In some exemplary embodiments, the rear shell 12 may have a main surface 126 and a plurality of side surfaces. Wherein, the top surface 121 is one of the side surfaces of the rear shell 12. The camera mechanism 2 is provided on the top surface 121 of the rear shell 12. The top surface 121 of the rear shell 12 is lower than the top surface 111 of the side frame 11. Taking the electronic device shown in FIG. 2 as an example, the top surface 121 of the rear shell 12 is lower than the top surface 111 of the side frame 11. The top surface 111 may be, for example, the top surface of the housing corresponding to the display panel portion of the electronic device, and the top surface 121 may be, for example, the top surface of the housing corresponding to the circuit board portion of the electronic device.

In some embodiments, the connecting member 6 may be configured to be connected to the top surface 111 of the side frame 11.

In some embodiments, the connecting member 6 may be configured to be connected to the top surface 121 of the rear shell 2. Since the top surface 121 is lower than the top surface 111, the top surface 121 is recessed relative to the top surface 111. The camera mechanism 2, support plate 4, and connecting member 6 which are all folded are located on the top surface 121 and hidden behind the top surface 111, so that the top surface 111 may shield the folded camera mechanism 2, so that the user may not see the camera mechanism 2 in front of the electronic device.

Figure 3:
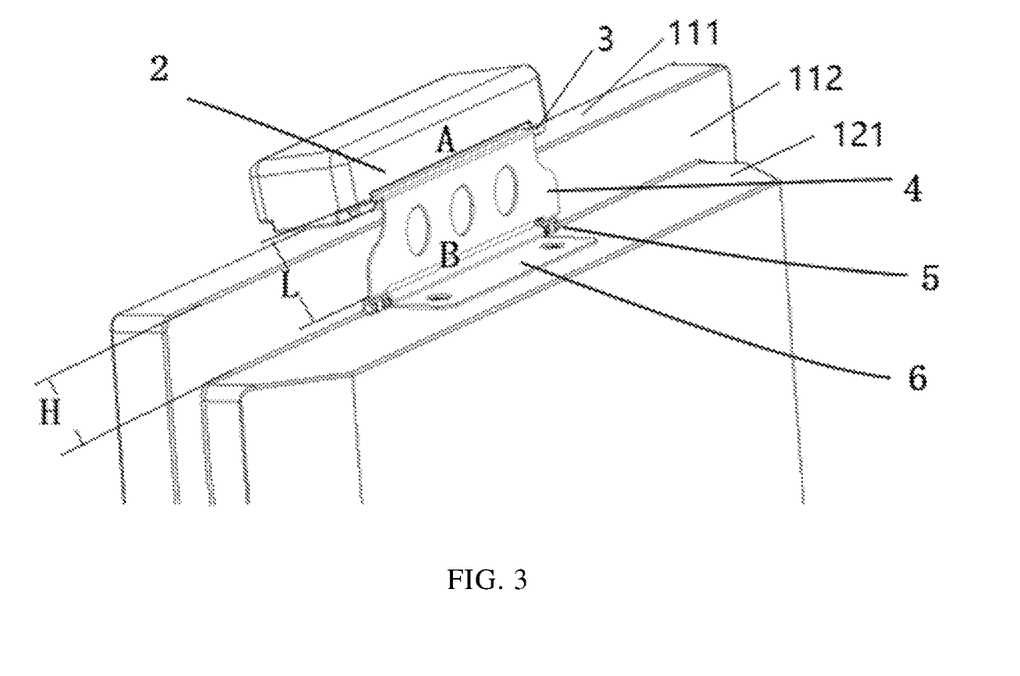
FIG. 3 is a schematic view showing that a camera mechanism according to some exemplary embodiments is in an unfolded state and above an end of an electronic device.
Figure 7:
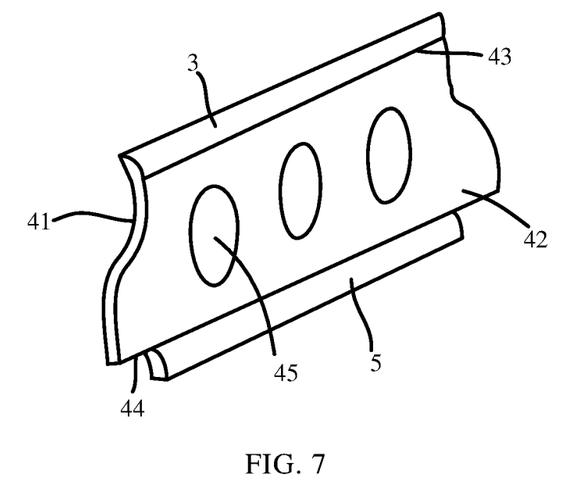
FIG. 7 is a schematic structural view of a support plate according to some exemplary embodiments.

In some exemplary embodiments, referring to FIG. 7, the support plate 4 may include a top surface 41, a bottom surface 42 and at least two opposite side ends 43 and 44. The at least two opposite side ends 43 and 44 are located between the top surface 41 and the bottom surface 42. For convenience of description, the top end 43 is referred to as a first top end, and the top end 44 is referred to as a second top end. The support plate 4 is connected to the first pivotal shaft 3 and the second pivotal shaft 5 through the at least two opposite side ends 43, 44 respectively. The support plate 4 may be, for example, a rectangular plate-like structure or a trapezoidal plate-like structure. As shown in FIG. 3, among the at least two opposite side ends 43, 44 of the support plate 4, the length of the side end 43 connected to the first pivotal shaft 3 is shorter than the length of the side end 44 connected to the second pivotal shaft 5, that is, the support plate 4 is a trapezoidal plate-like structure. In this way, the housing 7, the support plate 4 and the connecting member 6 may be stably connected. The support plate 4 may further be provided with at least one opening 45 penetrating the plate body. For example, in the embodiments shown in FIG. 3, the support plate 4 may be provided with three circular openings 45 that penetrate the plate body and are evenly distributed, so that overall mass of the camera mechanism 2 may be reduced, thereby making the camera mechanism 2 more light.

Figure 8:
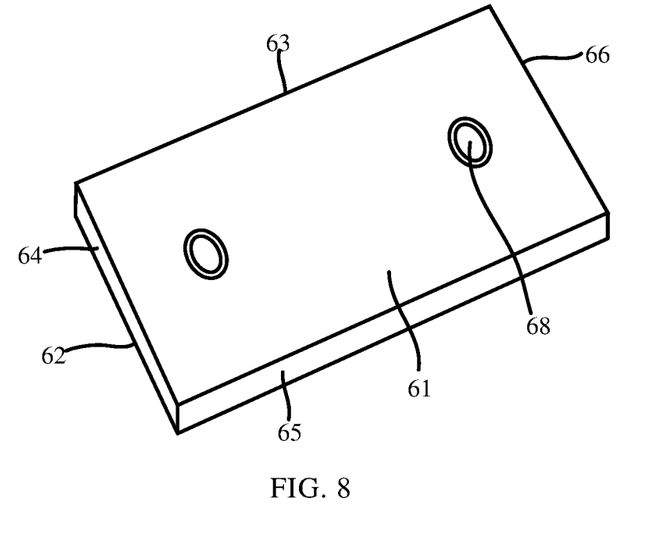
FIG. 8 is a schematic structural view of a connecting member according to some exemplary embodiments.

In some exemplary embodiments, for example, referring to FIG. 3, a side wall 112 is formed between the top surface 121 of the rear shell 2 and the top surface 111 of the side frame 11. The connecting member 6 is configured to be fixedly connected to the top surface 121 of the rear shell 2. The second pivotal shaft 5 is disposed on the side of the connecting member 6 close to the side wall 112. For example, the connecting member 6 may be connected to the top surface 121 of the rear shell 2 by at least one of bolt, adhesive, or magnet. For example, the connecting member 6 may be a rectangular plate-like structure. Referring to FIG. 8, the rectangular plate-like structure may include a top surface 61, a bottom surface 62, and four end surfaces 63, 64, 65, and 66 between the top surface and the bottom surface. The bolts 68 may penetrate the top surface 61 and the bottom surface 62 of the plate-like structure, and be inserted into the top surface 121 of the rear shell 2, so that the connecting member 6 is fixed on the top surface 121 of the rear shell 2. In some embodiments, an adhesive may be provided on the bottom surface 62 of the connecting member 6, and the connecting member 6 may be attached to the top surface 121 of the rear shell 2 through the adhesive. That is, the adhesive is provided between the connecting member 6 and the top surface 121 of the rear shell 2 so that the connecting member 6 is fixedly connected to the top surface 121 of the rear shell 2. In some embodiments, in a case where both the connecting member 6 and the rear shell 2 are made of iron, the connecting member 6 may also be attracted onto the top surface 121 of the rear shell 2 by a magnet. In this way, the connecting member 6 is fixedly connected to the top surface 121 of the rear shell 2.

For example, referring to FIG. 3, the side wall 112 is formed between the top surface 121 of the rear shell and the top surface 111 of the side frame, and the second pivotal shaft 5 is disposed on the side of the connecting member 6 close to the side wall 112. The support plate 4 and the camera mechanism 2 may rotate around the first pivotal shaft 3 and the second pivotal shaft 5. When the support plate 4 rotates around the second pivotal shaft 5 to be opposite to the side wall 112, and the camera mechanism 2 rotates around the first pivotal shaft 3 to be opposite to the top surface 111, the support plate 4 is opposed to the side wall 112, and the camera mechanism 2 is supported by the support plate 4 and is located above the top surface 111. When the support plate 4 and the camera mechanism 2 are switched from the folded state shown in FIG. 2 to the unfolded state shown in FIG. 3, the camera mechanism 2 is exposed above the top surface 111. In addition, since the camera mechanism 2 may rotate around the first pivotal shaft 3, when the camera mechanism 2 is an image acquisition device, the shooting angle of the camera mechanism 2 may be adjusted by rotating around the first pivotal shaft 3, so that the camera mechanism 2 may obtain different shooting angles to meet the shooting needs of subjects at different heights and distances.

Figure 6:
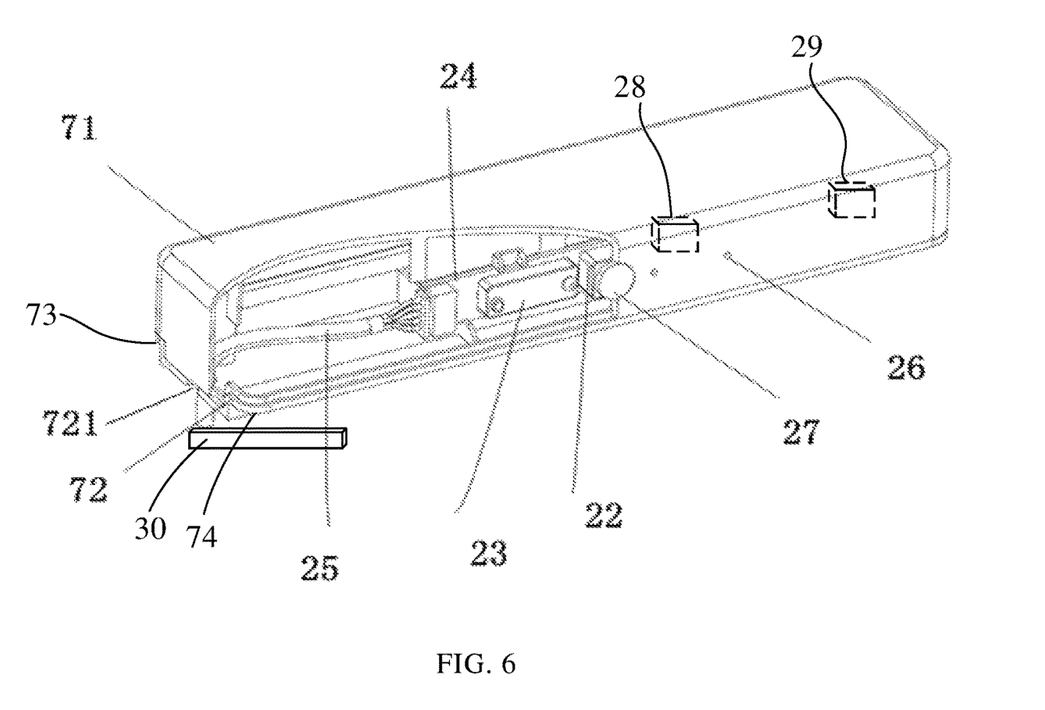
FIG. 6 is a schematic view of an internal structure of a camera mechanism according to some exemplary embodiments.

In some exemplary embodiments, for example, with reference to FIGS. 1 and 6, the camera mechanism 2 may be disposed in a housing 7, and the housing 7 may include at least two end portions 73, 74. For convenience of description, the end portion 73 is referred to as a first end portion 73, and the end portion 74 is referred to as a second end portion 74. The first end portion 73 is connected to the support plate 4 through the first pivotal shaft 3. The camera mechanism is disposed in the housing 7, so that the housing 7 may protect the camera mechanism 2. In addition, the housing 7 may be more conveniently connected to the first pivotal shaft 3 and the support plate 4 through the end portion 73.

In some exemplary embodiments, the support plate 4 may include a top surface 41, a bottom surface 42 and at least two opposite side ends 43, 44, the at least two opposite side ends 43, 44 are located between the top surface 41 and the bottom surface 42. The support plate 4 is connected to the first pivotal shaft 3 and the second pivotal shaft 5 through the at least two opposite side ends 43, 44 respectively. The width between the at least two opposite side ends 43 and 44 is not less than the height difference between the top surface 111 of the side frame 11 and the top surface 121 of the rear shell 2. For example, referring to FIG. 3, the width L between the first side end 43 and the second side end 44 of the support plate 4 is not less than the height difference H between the top surface 111 of the side frame 11 and the top surface 121 of the rear shell 2. In this way, when the support plate 4 is in a position opposite to the side wall 112 (that is, in the unfolded state shown in FIG. 3), a space above the top surface 111 of the side frame 11 of the device casing is reserved for the camera mechanism 2 to rotate in a direction towards the top surface 111. For example, the camera mechanism 2 may be an image acquisition device.

Figure 4A:
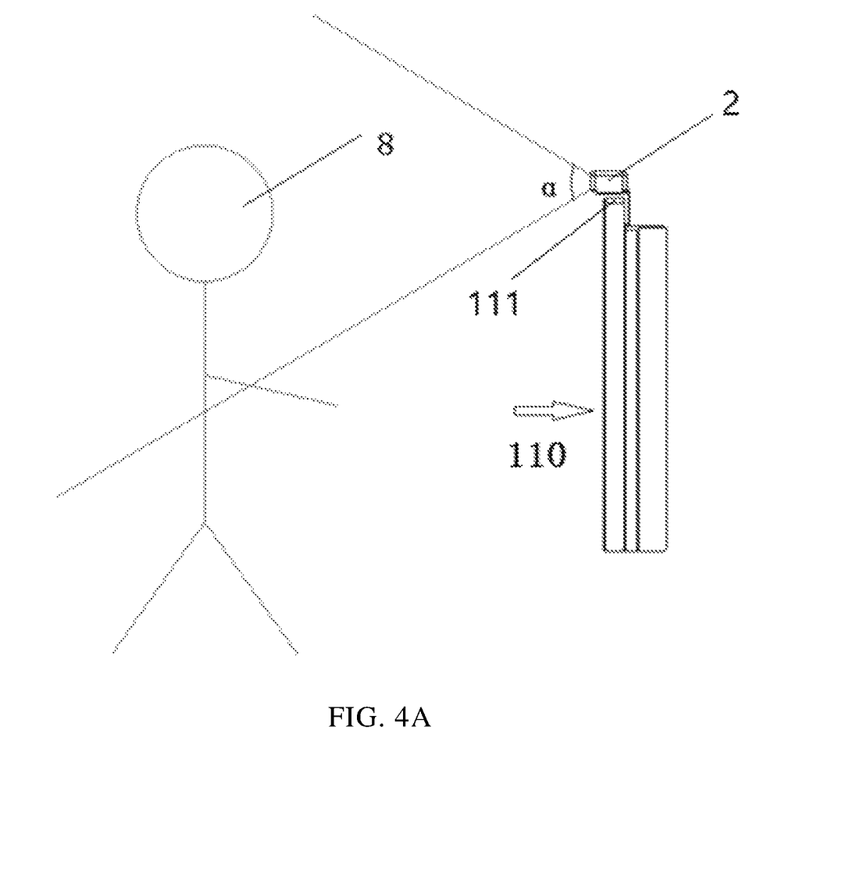
FIG. 4A is a schematic view showing that a camera mechanism according to some exemplary embodiments is in an unfolded state to shoot an object to be shot.

FIG. 4A shows a schematic view showing that a camera mechanism is in an unfolded state to shoot an object to be shot. As shown in FIG. 4A, the camera mechanism 2 is in a position parallel to the top surface 111 of the side frame 11 of the device casing 1. The shooting angle of the camera mechanism 2 for the object 8 to be shot is shown by an angle α shown in FIG. 4A.

Figure 4B:
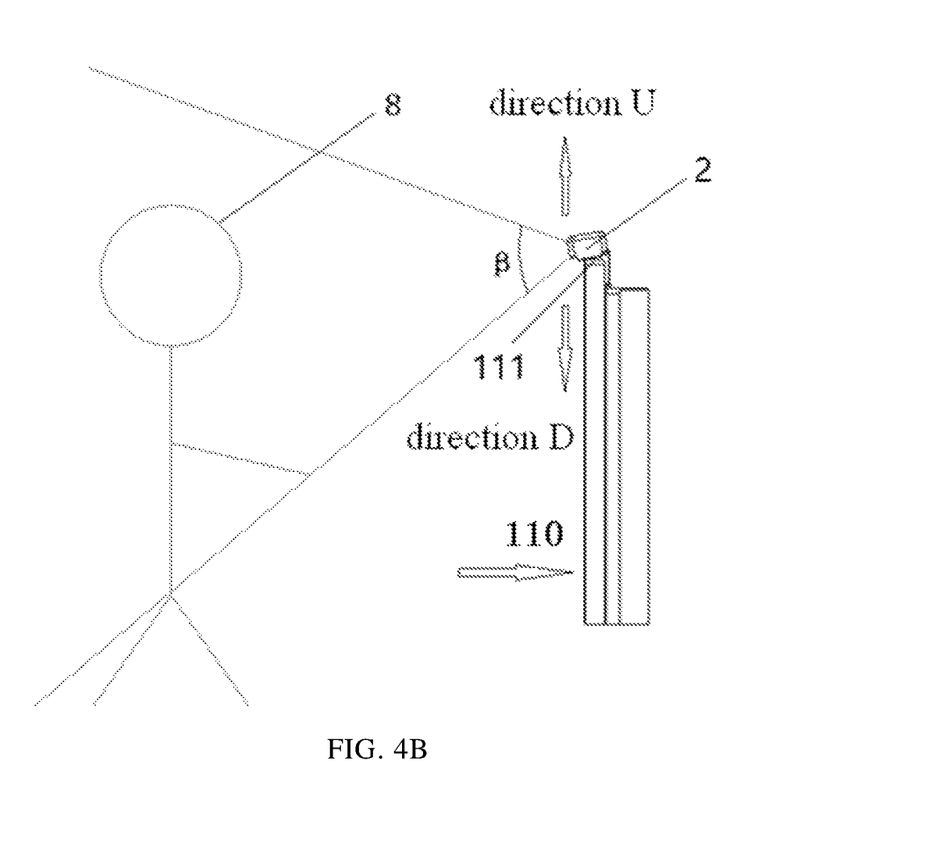
FIG. 4B is a schematic view showing that a camera mechanism according to some exemplary embodiments is in an unfolded state to shoot an object to be shot.

FIG. 4B shows a schematic view showing that the camera mechanism is in an unfolded state to shoot an object to be shot. As shown in FIG. 4B, a certain angle is formed between the camera mechanism 2 and the top surface 111 of the side frame 11 of the device casing 1. The shooting angle of the camera mechanism 2 for the object 8 to be shot is shown by the angle β shown in FIG. 4B. In the case shown in FIG. 4B, the camera mechanism 2 may rotate around the first pivotal shaft 3 not only towards the U direction shown in FIG. 4B, but also towards the D direction. The directions indicated by the arrows in FIG. 4 indicate the U direction and the D direction. In this way, the rotatable angle of the camera mechanism 2 may be further expanded, thereby expanding the viewing range of the camera mechanism.

In some exemplary embodiments, projections of all the camera mechanism 2, the support plate 4, and the connecting member 6 on the top surface 121 of the rear shell 2 fall within the top surface 121 of the rear shell 2. That is, a width of a combination of the camera mechanism 2, support plate 4, and connecting member 6 which have been folded in the direction away from the second pivotal shaft 5 is not greater than the width of the top surface 121. In other words, dimensions of the camera mechanism 2, the support plate 4, and the connecting member 6, which have been folded, in the direction perpendicular to the side wall 112 are not greater than a dimension of the top surface 121 in the direction perpendicular to the side wall 112.

Figure 5:
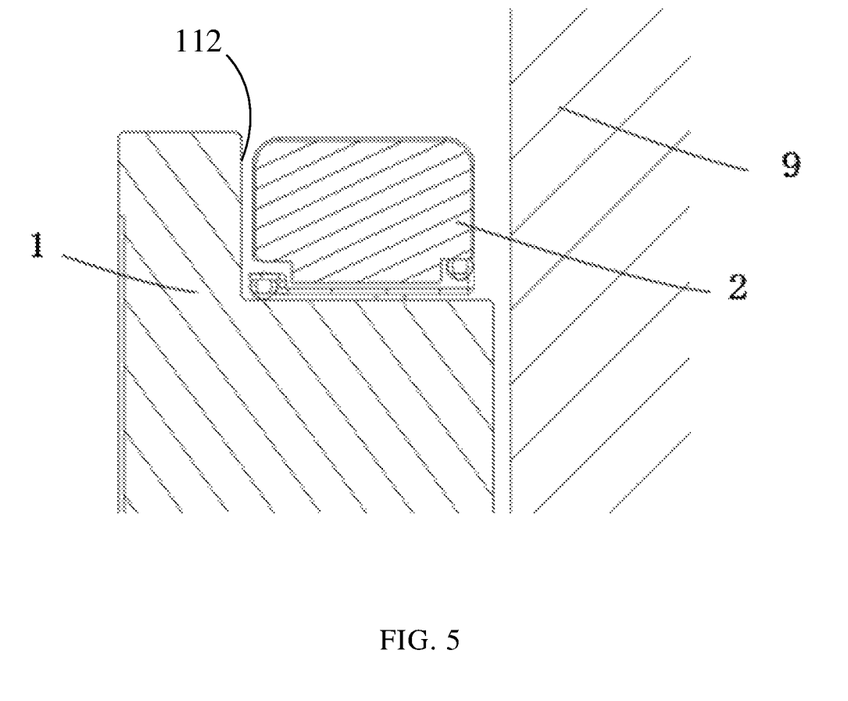
FIG. 5 is a schematic view showing that an electronic device according to some exemplary embodiments is installed close to a wall.

FIG. 5 shows a schematic view showing that an electronic device according to some embodiments of the present disclosure is installed close to a wall. As shown in FIG. 5, even if the device casing 1 is installed close to the wall 9, the dimensions of the camera mechanism 2, the support plate 4 and the connecting member 6 in the direction perpendicular to the side wall 112 are not greater than the distance between the side wall 112 and the wall 9, so the wall will not affect the folding or unfolding of the camera mechanism.

In some exemplary embodiments, referring to FIG. 6, the camera mechanism 2 may include a camera 22, and at least one of a microphone 23, a voice recognition device 28, a communication device 29, or a circuit board 24 may also be installed in the housing 7. The circuit board 24 is electrically connected to at least one of the camera 22, the microphone 23, the voice recognition device 28 or the communication device 29. The housing 7 may be provided with a first through hole in a positional correspondence with at least one of the microphone 23 or the voice recognition device 28. For example, the first through hole may be a microphone hole 26. Wherein, the communication device 29 may be a device of an electronic device to access the network, for example, a wireless communication module such as a WiFi module, a Bluetooth module, and the like, or a wire communication module. The voice recognition device 28 may be a processer or a chip including a storage medium on which a voice recognition program or a voice recognition software is stored. The microphone 23 is provided in the housing 7 to collect sound around the electronic device. The voice recognition device 28 is provided in the housing 7 to recognize the collected sound around the electronic device, so that the electronic device may respond to the recognized voice signal. The communication device 29 is provided in the housing 7 to reduce the interference of the main board of the electronic equipment to the signal of the communication device. In addition, a horn may also be provided on the housing 7, and the electronic device may emit a prompt sound through the horn. As shown in FIG. 6, the surface of the housing 7 is further provided with a microphone hole 26 and a camera window 27, wherein the microphone hole 26 is used to collect sound.

In some exemplary embodiments, the circuit board is installed close to an inner wall of the housing 7 away from the first pivotal shaft 3, and at least two of the camera 22, the microphone 23, the voice recognition device 28, or the communication device 29 are arranged on the circuit board 24 side by side in the length direction of the housing 7 (i.e., the direction parallel to the top surface 111). In this way, the components in the housing may be distributed along a straight line as much as possible, so that the overall shape of the camera device is slim, so the camera device may be easily installed in the recess as shown in FIGS. 1 to 3.

In some other exemplary embodiments, a flexible connecting wire 25 may also be provide in the housing, the housing 7 is provided with a second through hole 721 for allowing the flexible connecting wire to pass through. At least one of the camera 22, the microphone 23, the voice recognition device 28, the communication device 29 or the circuit board 24 may be electrically connected to the main board of the electronic device through the flexible connecting wire 25. In this way, the information obtained by at least one of the above components may be sent to the main board of the electronic device, so that the electronic device may process the information. For example, referring to FIG. 6, the camera 22, the microphone 23, the circuit board 24 and the flexible connecting wire 25 may be provided in the housing 7. Wherein, the housing may include an upper housing 71 and a lower housing 72, one end of the connecting wire 25 may be connected to the circuit board 24, and the other end of the connecting wire 25 may pass through the housing through the second through hole 721 provided in the housing 7 to be electrically connected to the main board 30 of the electronic device.

Continue to refer to FIG. 6, the first pivotal shaft 3 is connected to an end portion of the lower housing 72, the upper housing 71 and the lower housing 72 are detachably connected, at least one of the camera, the microphone, the voice recognition device, the communication device or the circuit board is provided in the lower housing 72. The second through hole 721 is opened at a corner of the bottom surface of the lower housing 72. Since the upper housing and the lower housing of the camera mechanism are detachable, and the internal devices are all disposed in the lower housing, it is convenient to detect or maintain the camera mechanism.

In some exemplary embodiments, the electronic device may further include an interface, the interface including at least a head end and a tail end, the head end of the interface is disposed in the housing of the electronic device, and is connected to the main board of the electronic device, and the tail end of the interface is exposed on the housing of the electronic device, the interface is configured to be connected to the tail end of the flexible connecting wire, so that the circuit board of the camera mechanism may be flexibly connected to and detached from the main board of the electronic device through the flexible connecting wire.

In some exemplary embodiments, a camera window may also be provided on the housing 7, and the camera window is provided on a side surface of the housing 7, which is a surface of the housing on the side of housing 7 opposite to the first pivotal shaft 3. Wherein, a position of the lens of the camera corresponds to a position of the camera window. For example, referring to FIG. 6, a camera window 27 is provided on the side surface of the housing, and the position of the lens of the camera corresponds to the position of the camera window 27. In this way, after the housing 7 rotates around the first pivotal shaft 3 to an certain angle with the support plate 4, the side surface of the housing 7 on which the camera window is located faces the front surface 110 of the electronic device (the front surface 110 of the electronic device is shown in FIG. 4A and FIG. 4B).

In some exemplary embodiments, as shown in FIGS. 1 and 3, the first pivotal shaft 3 and the second pivotal shaft 5 may be damping pivotal shafts. In this way, after adjusting the shooting angle of the camera mechanism through at least one of the first pivotal shaft and the second pivotal shaft, the camera mechanism may be fixed at the current shooting angle.

Some embodiments of the present disclosure also provide a camera device. The camera device includes: a camera mechanism 2, a first pivotal shaft 3, a support plate 4, a second pivotal shaft 5, and a connecting member 6. The camera mechanism 2 is connected to the support plate 4 through the first pivotal shaft 3, and the support plate 4 is connected to the connecting member 6 through the second pivotal shaft 5. The connecting member 6 is configured to be connected to the device casing of the electronic device, and the camera mechanism 2 and the support plate 4 may be folded through the first pivotal shaft 3 and the second pivotal shaft 5.

In some exemplary embodiments, the camera mechanism 2 is disposed in a housing 7. The housing 7 includes at least one end portion 73. The at least one end portion 73 is connected to the support plate 4 through the first pivotal shaft 3.

In some exemplary embodiments, the camera mechanism 2 includes a camera, and at least one of a microphone, a voice recognition device, a communication device, or a circuit board is also provided in the housing 7. The housing 7 is provided with a first through hole which is in a positional correspondence with the at least one of the microphone and the voice recognition module.

In some exemplary embodiments, the circuit board 24 is installed close to an inner wall of the second end portion 74 of the housing, and at least two of the camera, the microphone, the voice recognition device, or the communication device are arranged on the circuit board 24 side by side in the length direction of the housing 7.

In some exemplary embodiments, a flexible connecting wire 25 is further provided in the housing 7, the housing 7 is provided with a second through hole for allowing the connecting wire to pass through. At least one of the camera, the microphone, the voice recognition device, the communication device, or the circuit board is connected to the main board of the electronic device through the connecting wire 25.

In some exemplary embodiments, the housing 7 includes an upper housing 71 and a lower housing 72, the first pivotal shaft 3 is connected to the lower housing 72, and the upper housing 71 and the lower housing 72 are detachably connected. At least one of the camera, the microphone, the voice recognition device, the communication device, or the circuit board is disposed in the lower housing 72, and the second through hole 721 is opened at a corner of the bottom surface of the lower housing 72.

In some exemplary embodiments, the second end portion 74 of the housing 7 is provided with a camera window, a position of the lens of the camera corresponds to a position of the camera window, and the first end portion 73 and the second end portion 74 of the housing are opposite end portions.

In some exemplary embodiments, the length of the first pivotal shaft 3 is not greater than the length of the second pivotal shaft 5, the length of the first end of the support plate 4 is not smaller than the length of the first pivotal shaft, and the length of the second end of the support plate is not smaller than the length of the second pivotal shaft.

In some exemplary embodiments, the support plate is provided with at least one opening penetrating the plate body.

In some exemplary embodiments, the first pivotal shaft and the second pivotal shaft are damping pivotal shafts.

The camera mechanism of the embodiments of the present disclosure is connected to the support plate through the first pivotal shaft, and the support plate is connected to the connecting member through the second pivotal shaft. The connecting member is configured to be connected to the device casing, so that the camera mechanism and the support plate may be folded through the first pivotal shaft and the second pivotal shaft, thus the space occupied by the camera mechanism may be reduced.

Those skilled in the art should understand that the discussion of any of the above embodiments is merely exemplary, and is not intended to imply that the scope of the present disclosure is limited to these examples. Under the spirit of the present disclosure, the above embodiments or technical features in different embodiments may also be combined, the steps may be implemented in any order, and there are many other variations of the different embodiments of the present disclosure as described above, which are not provided in the details for simplicity.

In addition, in order to simplify the description and discussion, and in order not to obscure the present disclosure, well-known power/ground connections to integrated circuit (IC) chips and other components may or may not be shown in the drawings. In addition, the devices may be shown in the form of block views in order to avoid making the disclosure difficult to understand, and this also takes into account the fact that the details regarding the implementation of these devices in the block view are highly dependent on the platform on which the disclosure is to be implemented (that is, these details should be completely within the scope of those skilled in the art). Under the condition in which specific details (e.g., circuits) are set forth to describe exemplary embodiments of the present disclosure, it will be apparent to those skilled in the art that the present disclosure may be implemented without these specific details or with changes in these specific details. Therefore, these descriptions should be considered illustrative rather than restrictive.

Although the present disclosure has been described in conjunction with specific embodiments of the present disclosure, many alternatives, modifications, and variations of these embodiments will be apparent to those skilled in the art based on the foregoing description. For example, other memory architectures (e.g., dynamic RAM (DRAM)) may use the discussed embodiments.

The embodiments of the present disclosure are intended to cover all such substitutions, modifications, and variations that fall within the broad scope of the appended claims. Therefore, any omission, modification, equivalent replacement, improvement or the like made within the spirit and principle of this disclosure should be included in the scope of protection of this disclosure.

What is claimed is:

1. An electronic device, comprising:
a device casing, the device casing comprising a side frame and a rear shell;
a connecting member fixedly connected to the side frame or the rear shell;
a first pivotal shaft;
a second pivotal shaft;
a camera mechanism connected to the side frame or the rear shell; and
a support plate, the camera mechanism being connected to the support plate through the first pivotal shaft, the support plate being connected to the connecting member through the second pivotal shaft,
wherein the support plate is rotatable relative to the connecting member through the second pivotal shaft, so as to drive the camera mechanism to rotate above a top surface of the side frame of the device casing, and the camera mechanism is rotatable relative to the support plate through the first pivotal shaft, so as to adjust an orientation of the camera mechanism;
the rear shell comprises a main surface and four side surfaces, one of the four side surfaces of the rear shell is a top surface of the rear shell, and the connecting member is fixedly connected to the top surface of the rear shell;
the side frame comprises a main surface and four side surfaces, one of the four side surfaces of the side frame is a top surface of the side frame;
the top surface of the rear shell is lower than the top surface of the side frame the support plate comprises a top surface, a bottom surface and at least two opposite side ends, the at least two opposite side ends are located between the top surface and the bottom surface of the support plate, and the support plate is respectively connected to the first pivotal shaft and the second pivotal shaft through the at least two opposite side ends of the support plate;
the device casing further comprises a side wall, the side wall being located between the tip surface of the rear shell and the top surface of the side frame; and
the second pivotal shaft is disposed on a side of the connecting member close to the side wall.

2. The electronic device according to claim 1, wherein a projection of a combination of the camera mechanism, the support plate, and the connecting member on the top surface of the rear shell falls within the top surface of the rear shell.

3. The electronic device according to claim 1, wherein the at least two opposite side ends of the support plate comprise a first side end and a second side end, and a width between the first side end and the second side of the support plate is not less than a height difference between the top surface of the side frame and the top surface of the rear shell.

4. The electronic device according to claim 1, wherein the support plate comprises at least one opening penetrating the support plate.

5. The electronic device according to claim 1, wherein the support plate has a trapezoidal plate-like structure.

6. The electronic device according to claim 1, wherein a bolt penetrates the connecting member and is inserted into the top surface of the rear shell so that the connecting member is fixedly connected to the top surface of the rear shell; and/or,
an adhesive is provided between the connecting member and the top surface of the rear shell so that the connecting member is fixedly connected to the top surface of the rear shell; and/or,
both the connecting member and the rear shell are made of iron, the connecting member is attracted onto the top surface of the rear shell by a magnet so that the connecting member is fixedly connected to the top surface of the rear shell.

7. The electronic device according to claim 1, wherein the electronic device further comprises a housing, the camera mechanism is disposed in the housing, the housing comprises at least a first end portion, and the first end portion is connected to the support plate through the first pivotal shaft.

8. The electronic device according to claim 7, wherein the camera mechanism comprises a camera, and the electronic device further comprises at least one of a microphone, a voice recognition device, a communication device, or a circuit board provided in the housing, the circuit board is electrically connected to at least one of the camera, the microphone, the voice recognition device or the communication device, and the housing is provided with a first through hole in a positional correspondence with at least one of the microphone and the voice recognition device.

9. The electronic device according to claim 8, wherein the circuit board is installed close to an inner wall of the housing away from the first pivotal shaft, and at least two of the camera, the microphone, the voice recognition device, or the communication device are arranged on the circuit board side by side in a length direction of the housing.

10. The electronic device according to claim 9, wherein the electronic device further comprises a flexible connecting wire in the housing, the housing is provided with a second through hole for allowing the flexible connecting wire to pass through, at least one of the camera, the microphone, the voice recognition device, the communication device, or the circuit board is electrically connected to a main board of the electronic device through the flexible connecting wire.

11. The electronic device according to claim 10, wherein the housing comprises an upper housing and a lower housing, the first pivotal shaft is connected to the lower housing, the upper housing and the lower housing are detachably connected, at least one of the camera, the microphone, the voice recognition device, the communication device, or the circuit board is disposed in the lower housing, and the second through hole is opened at a corner of a bottom surface of the lower housing.

12. A camera device, comprising:
a camera mechanism;
a support plate, the support plate comprising a top surface, a bottom surface and at least two opposite side ends, the at least two opposite side ends being located between the top surface and the bottom surface of the support plate;
a first pivotal shaft and a second pivotal shaft, the first pivotal shaft and the second pivotal shaft being located at the two opposite side ends of the support plate, respectively;
and a connecting member, wherein the camera mechanism is connected to the support plate through the first pivotal shaft, the support plate is connected to the connecting member through the second pivotal shaft, and the camera mechanism and the support plate may be folded or unfolded through the first pivotal shaft and the second pivotal shaft;
the camera device further comprises a housing, the camera mechanism is disposed in the housing, the housing comprises at least a first end portion, and the first end portion of the housing is connected to the support plate through the first pivotal shaft;
the camera mechanism comprises a camera, and the camera device further comprises at least one of a microphone, a voice recognition device, a communication device, or a circuit board provided in the housing, the circuit board is electrically connected to at least one of the camera, the microphone, the voice recognition device or the communication device, and the housing is provided with a first through hole in a positional correspondence with at least one of the microphone and the voice recognition device, and
the circuit board is installed close to an inner wall of the housing away from the first pivotal shaft, and at least two of the camera, the microphone, the voice recognition device, or the communication device are arranged on the circuit board side by side in a length direction of the housing.

13. The camera device according to claim 12, wherein the camera device further comprises a flexible connecting wire in the housing, the housing is provided with a second through hole for allowing the flexible connecting wire to pass through, at least one of the camera, the microphone, the voice recognition device, the communication device, or the circuit board is electrically connected to an external circuit board through the flexible connecting wire.

14. The camera device according to claim 13, wherein the housing comprises an upper housing and a lower housing, the first pivotal shaft is connected to the lower housing, the upper housing and the lower housing are detachably connected, at least one of the camera, the microphone, the voice recognition device, the communication device, or the circuit board is disposed in the lower housing, and the second through hole is opened at a corner of a bottom surface of the lower housing.

* * * * *